United States Patent
Shriver

[15] 3,643,312
[45] Feb. 22, 1972

[54] METHOD OF MAKING FINNED TUBING

[72] Inventor: Charles S. Shriver, Oreland, Pa.

[73] Assignee: Orbit Manufacturing Company, Perkasie, Pa.

[22] Filed: June 18, 1970

[21] Appl. No.: 47,308

Related U.S. Application Data

[62] Division of Ser. No. 809,744, Mar. 24, 1969, Pat. No. 3,550,680.

[52] U.S. Cl..................29/157.3 B, 29/157.3 A, 165/182, 219/365, 219/540
[51] Int. Cl..........................................................B21d 53/02
[58] Field of Search.......219/365, 540; 29/157.3 A, 157.3 B; 165/55, 68, 76, 80, 182

[56] References Cited

UNITED STATES PATENTS

| | | | |
|---|---|---|---|
| 3,526,958 | 9/1970 | Grant | 165/182 X |
| 3,020,382 | 2/1962 | Harrell | 165/55 X |

*Primary Examiner*—John F. Campbell
*Assistant Examiner*—Donald C. Reiley, III
*Attorney*—Howson and Howson

[57] ABSTRACT

A method is disclosed for making a finned tube heat exchanger wherein each of a plurality of platelike fins is mounted on an elongated heat conductor by means of a series of interference fits provided between each fin and the conductor. The interference fits are effected by forming a noncircular aperture in the fins, forming a slightly smaller noncircular cross-sectional shape on the conductor, aligning the conductor with the apertures, displacing the conductor longitudinally through the apertures, and, after the fins are properly positioned on the conductor, locking them in place by effecting relative rotation through a portion of a turn to cause a series of interference fits to be established between each fin and the conductor.

7 Claims, 10 Drawing Figures

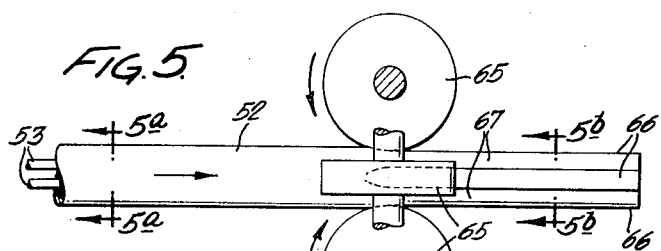
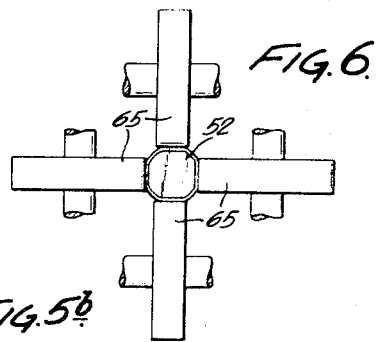
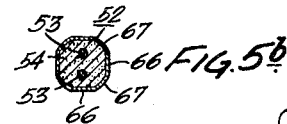
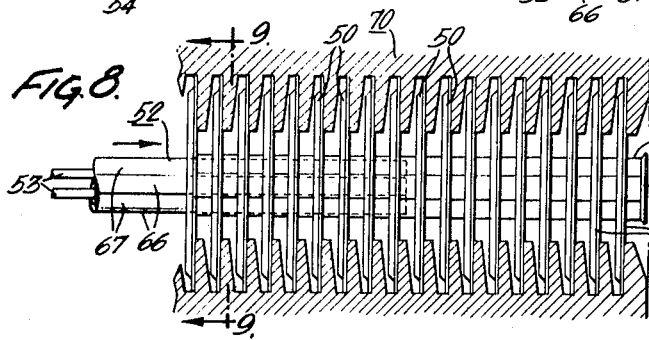
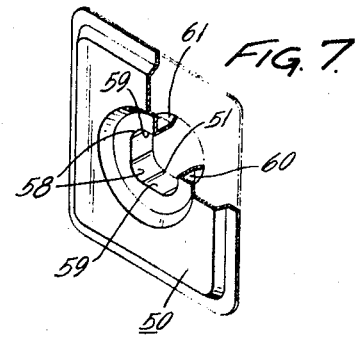
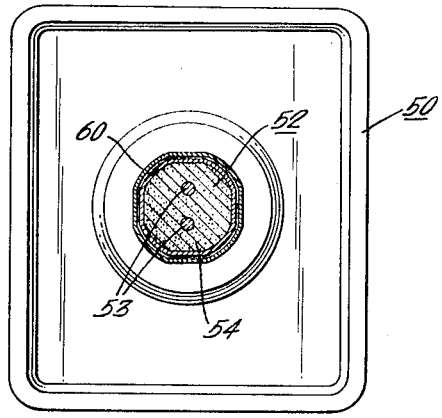
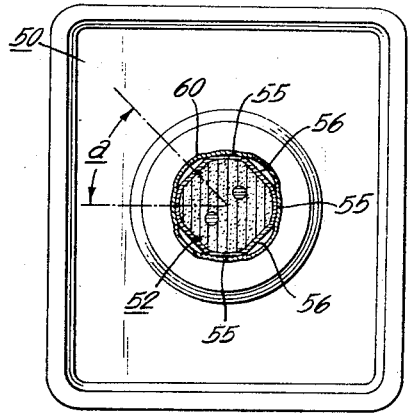
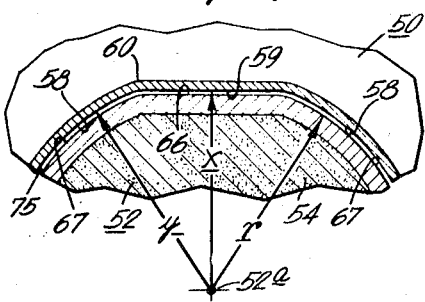
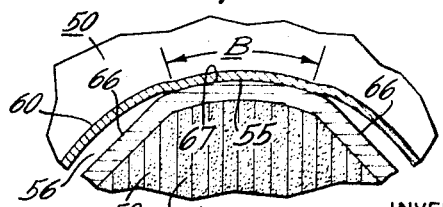

3,643,312

1

METHOD OF MAKING FINNED TUBING

The present application is a division of my copending application Ser. No. 809,744, filed Mar. 24, 1969, now U.S. Pat. No. 3,550,680, and entitled Finned Tube Heat Exchanger and Method of Making Same which may be referred to for a disclosure of a completed heat exchanger assembly embodying finned tubing made in accordance with the present invention.

The present invention relates to a method of making finned tubing.

Heretofore, fins have been mounted onto lengths of tubing by a number of methods, including: crimping against the tubing a skirt surrounding an aperture in each fin, expanding the tubing internally against the fin skirts, and soldering or welding the fins onto the tubing. When the fins are mounted on the tubing by crimping and by internally expanding the tubing, loose-fitting fins tend to occur. When the fins are secured to tubing by soldering or welding, loose-fitting fins are avoided; however, such finned tubing is costly because these are slow manufacturing processes. Accordingly, none of these methods has provided a completely satisfactory solution to the problem of mounting fins onto tubing in positive heat transfer relation and in an economical manner.

When finned tubing houses electric heating elements, the mechanism by which the fins are mounted on the tubing is even more important than when the tubing contains a fluid heating medium, since the presence of loose-fitting fins may tend to cause overheating in the zone thereof, thereby shortening the life of the heating elements and possibly causing them to burn out. In addition, the cost of the materials from which electrically energized finned tubing is fabricated, including the cost of the alloy heating elements, makes it desirable to provide finned tubing having a high capacity for heat output per unit length. In the interest of reducing manufacturing costs, it is also desirable to provide a method for mounting fins onto elongated tubing in an expeditious manner and after the elements have been mounted inside the tubing.

With the foregoing in mind, it is the primary object of the present invention to provide a novel method for making finned tubing in which the fins are secured to the tubing in positive, conductive, heat transfer relationship.

It is another object of the present invention to provide an improved and economical method for making finned tubing.

More specifically, in the present invention, each of a plurality of platelike fins is secured in spaced-apart parallel relationship with other fins on elongated tubing by means of a series of interference fits provided between each fin and the tubing. The interference fits are effected by forming a noncircular aperture in each fin and forming an identical but slightly smaller noncircular cross-sectional shape on the tubing. The tubing is thereafter aligned with the apertures in the fins and displaced longitudinally therethrough. After the fins have been located on the tubing, they are locked in place thereon when they are rotated through a portion of a turn relative to the tubing, or vice versa. Thus, the fins are deformed around their apertures and a series of interference fits are provided at spaced intervals between each fin and the tubing to promote conductive heat transfer therebetween.

These and other objects, features and advantages of the present invention should become apparent from the following description when taken in conjunction with the accompanying drawing in which:

FIG. 1 is a transverse cross-sectional view taken in a plane parallel to and between adjacent fins in a length of finned tubing produced in accordance with the method of the present invention;

FIG. 2 is an enlarged fragmentary view of the finned tubing of FIG. 1, the view illustrating an interference fit formed between the tubing and the fin;

FIGS. 3 and 4 are views similar to FIGS. 1 and 2, respectively, but illustrating the position of the fin and tubing before formation of the interference fits therebetween;

FIG. 5 is a schematic diagram illustrating a length of round tubing advancing through a series of rollers which form the tubing into a nonround configuration;

FIGS. 5a and 5b are sectional views taken along lines 5a—5a and 5b—5b, respectively, to illustrate the cross section of the tubing before and after passing through the rollers;

FIG. 6 is an end elevational view of FIG. 5;

FIG. 7 is a perspective view of a platelike fin having a portion broken away to illustrate the shape of its aperture and a skirt surrounding the aperture; and FIG. 8 is a schematic diagram of a fixture which maintains the apertures in a series of fins in alignment while the shaped tubing is being displaced axially rightward therethrough.

Referring now to the drawing, there is illustrated in FIG. 1 a portion of a finned tube heat exchanger produced according to the method of the present invention. The illustrated heat exchanger comprises a fin 50 which is mounted in spaced parallel relation with a series of like fins on an elongated heat conductor or tubing 52. Heat is transferred from the fin 50 and to an ambient fluid medium, the heat being supplied by electrical energy dissipated from a pair of wire elements 53,53 which are located centrally in the conductor 52 and which are surrounded by electrical insulation material 54 such as aluminum or magnesium oxide. As may be seen in FIG. 7, each fin 50 has a central aperture 51 surrounded by a skirt 60 which terminates in a peripheral flange 61 spaced from the plane of the fin. The flange 61 provides structural rigidity for the skirt 60 to assist it in elastically engaging the conductor 52 in a manner to be described. The skirt 60 also provides sufficient surface area around the aperture 51 of the fin 50 to promote conductive heat transfer between the conductor 52 and the fin 50 across a series of interference fits 55,55 located at spaced intervals around the periphery of the conductor 52.

According to known methods of making finned tubing housing electric heating elements, the fins are first secured to the tubing and the elements are thereafter mounted inside the tubing. According to the method of the present invention, however, the reverse procedure occurs; that is, the elements and insulation are first placed inside the tubing and thereafter the fins are mounted on the tubing. It is to be understood, of course, that the method of the present invention is readily adapted for manufacturing finned tubing which does not receive its thermal energy from electrical elements mounted inside, for instance, finned tubing heated by hot water.

To this end, the first stage of the present manufacturing method occurs when a round length of the conductor 52 mounting the elements 53,53 and insulation 54 is advanced longitudinally between a set of rollers 65,65 disposed in two pairs with each pair engaging diametrically opposite sides of the conductor 52 (See FIGS. 5 and 6). Thus, the circular cross section (FIG. 5a) of the conductor 52 is transformed into a noncircular cross section (FIG. 5b) which has a series of straight portions 66,66 alternating with a series of arcuate portions 67,67 around the periphery of the conductor 52.

In the second stage of the process, the skirt 60 surrounding the aperture 51 in the fin 50 is formed with a noncircular configuration which, in the present instance, is identical to the cross section of the conductor 52 in a plane normal to the longitudinal axis 52a of the conductor 52 so as to provide mating therebetween. Thus, the skirt 60, and hence the aperture 51, has a series of straight portions 59,59 alternating with a series of arcuate portions 58,58. In the illustrated embodiment, the straight portions 59,59 define flats intermediate the flange 61 and the plane of the fin 50, and they may be formed by suitable metalworking machinery; for example, by means of a die assembly which presses diametrically against opposite sides of the skirt 60. Irrespective of the manner in which the straight portions 59,59 are formed, it is necessary for the straight portions 59,59 to be spaced from the axis 52a a distance $x$ (FIG. 4) which is less than a distance $r$ if satisfactory results are to be achieved. The distance $r$ is the distance between the axis 52a and the arcuate portions 67,67 of the conductor 52.

Upon completion of the conductor- and fin-shaping operations, the fins 50,50 are positioned in a fixture 70 (FIG. 8) which is designed to align the apertures 51,51 of the fins 50,50 with one another.

After the fins 50,50 have been placed in the fixture 70, the conductor 52 is properly aligned with the leftwardmost one of the series of fins 50,50. Proper alignment occurs when the arcuate portions 58,58 of the skirt 60 register with the arcuate portions 67,67 of the conductor 52 and the straight portions 59,59 of the fin 50 register with the straight portions 66,66 on the conductor. When the conductor and end fin are so aligned, a slight clearance (approximately 0.003 inch) exists between each of the aforementioned surfaces (See FIG. 4). The clearance is the difference between the dimensions $y$ and $r$ of FIG. 4.

In the next stage, the conductor 52 is displaced axially rightward through the fin apertures as indicated by the arrow in FIG. 8. It is to be noted that, alternatively, the fixture 70 may be displaced leftward with respect to the conductor 52. In this manner, the fins 50,50 are disposed in spaced parallel relation on the conductor 52. If desired, a noninsulating lubricant may be applied to the conductor 52 before it is displaced axially through the fin apertures to facilitate insertion of the conductor 52.

For the purpose of locking the fins 50,50 onto the conductor 52, the ends of the conductor are clamped and the fixture 70 is rotated with respect to the conductor. In the present instance, the fixture 70 is rotated through an angle $a$ (FIG. 1) which is equal to one-quarter of a turn or approximately 45°. It is to be noted, however, that the magnitude of the angle $a$ may be varied depending on the configurations of the tubing and the fins, and the number of interference fits desired, as set forth more fully in my aforementioned application.

Finned tubing manufactured in accordance with the foregoing method is characterized by a series of interference fits 55,55 and a series of spaces 56,56 located between the conductor 52 and the skirt 60 and intermediate the interference fits 55,55. The spaces 56,56 result from rotation of the fins 50,50 relative to the conductor 52 which rotation causes the arcuate portions 67,67 of the conductor 52 to engage the straight portions 59,59 of the skirt 60 and the straight portions 66,66 of the conductor 52 to register with the arcuate portions 58,58 of the skirt 60. As more fully discussed in my aforementioned application, the existence of the spaces 56,56 does not adversely affect the heat transfer efficiency of the finned tubing; since, the metal-to-metal contact in the zones of the interference fits 56,56 provides a greater capacity for the transfer of heat by conduction between the conductor 52 and the fins 50,50 than would be the capacity for the fins 50,50 to transfer heat to the ambient fluid medium under normal conditions. Thus, overheating of the finned tubing is avoided, and finned tubing having an increased heat transfer capacity per unit length is provided.

In view of the foregoing, it should now be apparent that an improved method has been provided for economically producing finned tubing.

Although a finned tube heat exchanger having each fin mounted onto its heat conductor with four interference fits is illustrated, the method of the present invention is equally adapted for producing finned tubing having a greater or lesser number of such fits.

Thus, while a preferred method has been described in detail, various modifications, alterations or changes may be made without departing from the spirit and scope of the present invention as defined in the appended claims.

I claim:

1. A method for mounting skirted fins onto an elongated heat conductor comprising the steps of: forming a skirt around an aperture in each of said fins with a series of substantially straight portions alternating with a like series of arcuate portions to provide said skirt with a noncircular shape, forming on said conductor a slightly smaller noncircular shape normal to the longitudinal axis of said conductor with straight and arcuate portions corresponding to similar portions on said skirts, aligning said noncircular shape on the conductor with said noncircular skirts on the fins, displacing said conductor axially relative to said fins to position the fins thereon, and relatively rotating the fins through a predetermined angle on said axis to thereby securely mount the fins on the conductor, said relative rotation disposing the straight portions on said conductor in spaced confronting relation with the arcuate portions on said fins to effect an interference fit between said skirts and the arcuate portions of said conductor by deforming the skirts.

2. A method in accordance with claim 1 wherein said substantially straight portions are formed on said fins a spaced distance from said axis, said distance being less than the distance between said axis and the arcuate portions formed on said conductor.

3. A method in accordance with claim 1 wherein a peripheral flange is formed on each skirt and said straight portions are formed on said skirt between said flange and the plane of said fin.

4. A method in accordance with claim 1 wherein said noncircular shape on the conductor is formed by advancing said conductor longitudinally between opposed rollers.

5. A method in accordance with claim 1 including the step of lubricating said conductor before displacing said fins thereonto.

6. A method in accordance with claim 1 wherein said noncircular shapes of said conductor and said skirt mate with limited clearance therebetween prior to said relative rotation.

7. A method in accordance with claim 6 wherein said shapes are identical.

* * * * *